(12) United States Patent
Burger et al.

(10) Patent No.: US 9,114,333 B2
(45) Date of Patent: Aug. 25, 2015

(54) METHOD FOR PRODUCING ANTIFOAM COMPOSITIONS

(71) Applicant: Wacker Chemie AG, Munich (DE)

(72) Inventors: Willibald Burger, Burghausen (DE); Holger Rautschek, Nuenchritz (DE); Josef Wimmer, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/362,787

(22) PCT Filed: Dec. 17, 2012

(86) PCT No.: PCT/EP2012/075715
§ 371 (c)(1),
(2) Date: Jun. 4, 2014

(87) PCT Pub. No.: WO2013/092462
PCT Pub. Date: Jun. 27, 2013

(65) Prior Publication Data
US 2014/0316015 A1    Oct. 23, 2014

(30) Foreign Application Priority Data
Dec. 21, 2011 (DE) .......... 10 2011 089 374

(51) Int. Cl.
*B01D 19/04* (2006.01)
*C08L 83/04* (2006.01)

(52) U.S. Cl.
CPC ........... *B01D 19/0409* (2013.01); *C08L 83/04* (2013.01)

(58) Field of Classification Search
None
See application file for complete search history.

(56) References Cited

U.S. PATENT DOCUMENTS

| | | | |
|---|---|---|---|
| 2,676,182 A | 4/1954 | Daudt et al. | |
| 3,383,327 A | 5/1968 | Sullivan | |
| 3,560,401 A | 2/1971 | O'Hara et al. | |
| 3,963,627 A | 6/1976 | Cottrell | |
| 4,145,308 A | 3/1979 | Simoneau et al. | |
| 4,919,843 A | 4/1990 | Innertsberger et al. | |
| 6,197,384 B1 | 3/2001 | Schubert et al. | |
| 6,197,914 B1 | 3/2001 | Kaeppler et al. | |
| 6,521,586 B1* | 2/2003 | Hoogland et al. | 510/466 |
| 6,605,183 B1 | 8/2003 | Rautschek et al. | |
| 2003/0100631 A1 | 5/2003 | Barthel et al. | |
| 2004/0106749 A1 | 6/2004 | Burger et al. | |
| 2005/0192395 A1 | 9/2005 | Panz et al. | |
| 2007/0112078 A1* | 5/2007 | Procter et al. | 516/117 |
| 2008/0200608 A1 | 8/2008 | Burger et al. | |
| 2009/0137446 A1* | 5/2009 | Rautschek et al. | 510/347 |

FOREIGN PATENT DOCUMENTS

| | | |
|---|---|---|
| DE | 2107082 | 8/1971 |
| DE | 2925722 A1 | 2/1981 |
| EP | 0301531 A2 | 2/1989 |
| EP | 0726086 B1 | 8/1996 |
| EP | 0887097 A1 | 12/1998 |
| EP | 0927733 A1 | 7/1999 |
| EP | 0967252 A1 | 12/1999 |
| EP | 1060778 A1 | 12/2000 |
| EP | 1076073 A1 | 2/2001 |
| EP | 1304361 B1 | 4/2003 |
| EP | 1424117 A2 | 6/2004 |
| EP | 1561728 A1 | 8/2005 |
| GB | 2350117 A | 11/2000 |
| WO | 2006128624 A1 | 12/2006 |

OTHER PUBLICATIONS

Parsonage et al., Silicate Sources of Polyorganosiloxane Materials: A Brief Rreview; The Science of Materials and Polymers Group; The University of Greenwich, Woolwich, London SE18 6PF, UK; pp. 98-106, 1995.

\* cited by examiner

*Primary Examiner* — Robert S Loewe
(74) *Attorney, Agent, or Firm* — Brooks Kushman P.C.

(57) ABSTRACT

Effective and long lasting defoamer compositions are prepared by admixing an organopolysiloxanes, a hydrophilic silica, a hydrophobic silica, optionally an organopolysiloxanes resin, and optionally a water insoluble inorganic compound, at a temperature of 50° C. to 250° C. until the viscosity of the composition has decreased to at least half its original viscosity prior to heating.

21 Claims, No Drawings

METHOD FOR PRODUCING ANTIFOAM COMPOSITIONS

CROSS-REFERENCE TO RELATED APPLICATIONS

This application is the U.S. National Phase of PCT Appln. No. PCT/EP2012/075715 filed Dec. 17, 2012, which claims priority to German Application No. 10 2011 089 374.1 filed Dec. 21, 2011, the disclosures of which are incorporated in their entirety by reference herein.

BACKGROUND OF THE INVENTION

1. Field of the Invention

The invention relates to methods for producing compositions comprising organosilicon compounds and hydrophobic silicas and to the use thereof as defoamers.

2. Description of the Related Art

In many liquid systems, more particularly in aqueous systems, which include surface-active compounds as desired or else as unwanted constituents, it is possible for problems to occur as a result of foaming if these systems come into more or less intensive contact with gaseous substances, such as during the gassing of wastewaters, during the intensive stirring of liquids, during distillation, washing or coloring operations, or during dispensing procedures, for example.

This foam can be controlled by mechanical means or through the addition of defoamers. Siloxane-based defoamers have proven particularly appropriate. Defoamers based on siloxanes are prepared according to U.S. Pat. No. 3,383,327 A, for example, by heating hydrophilic silica in polydimethylsiloxanes. Using basic catalysts allows the effectiveness of such defoamers to be improved, as disclosed in U.S. Pat. No. 3,560,401 A. An alternative is to disperse hydrophobized silica in a polydimethylsiloxane, in accordance, for example, with DE 29 25 722 A1.

Nevertheless, the effectiveness of the resulting defoamers is usually in need of improvement. Thus U.S. Pat. No. 4,145,308, for example, describes a defoamer preparation which as well as a polydiorganosiloxane and silica also comprises a copolymer made up of $(CH_3)_3SiO_{1/2}$ and $SiO_2$ units.

Copolymers made up of $(CH_3)_3SiO_{1/2}$ and $SiO_2$ units are said to be advantageous also in combination with siloxanes which carry terminal long alkyl groups, as described in EP-A 301 531 (corresponding U.S. Pat. No. 4,919,843 A). In these formulations, mixtures of fumed and precipitated silicas are used as well.

EP-B 726 086 achieves enhanced effectiveness for the defoamer formulation by using a mixture of pretreated hydrophobized silica and silica hydrophobized in situ. In this case, first the hydrophilic silica is mixed with the polysiloxane. This is followed by the hydrophobizing in situ at elevated temperatures, and, after cooling has taken place, the pretreated hydrophobized silica is added.

In strongly foaming, surfactant-rich systems, however, such as in laundry detergents or the black liquor produced in papermaking, for example, the known defoamer formulations do not always have a sufficiently long-lasting effectiveness and compatibility.

SUMMARY OF THE INVENTION

An object of the invention was to provide defoamer formulations with which the disadvantages identified above are avoided. These and other objects are surprisingly and unexpectedly achieved by admixing an organopolysiloxanes, a hydrophilic silica, a hydrophobic silica, optionally an organopolysiloxanes resin, and optionally a water insoluble inorganic compound, at a temperature of 50° C. to 250° C. until the viscosity of the composition has decreased to at least half its original viscosity prior to heating.

DETAILED DESCRIPTION OF THE PREFERRED EMBODIMENTS

The invention provides a method for producing compositions comprising hydrophobic silica, characterized in that
(1) a mixture comprising
  (A) organopolysiloxanes having a viscosity of 10 to 10,000,000 mm²/s at 25° C. and 1013 hPa composed of units of the formula $$R_a(R^1O)_bSiO_{(4-a-b)/2} \quad (I),$$ 

in which
  R may be identical or different and denotes a monovalent, optionally substituted hydrocarbon radical having 1-30 carbon atoms, preferably 1-18 carbon atoms, or a hydrogen atom,
  $R^1$ may be identical or different and denotes a hydrogen atom or a monovalent hydrocarbon radical having 1-4 carbon atoms,
  a is 0, 1, 2 or 3, and
  b is 0, 1, 2 or 3,
  with the proviso that the sum a+b is ≤3 and in more than 50% of all the units of the formula (I) in the organopolysiloxane (A), the sum a+b is 2,
  the viscosity of the organopolysiloxanes (A) being determined by the number of units of the formula (I),
  (B) hydrophilic silicas having a BET surface area of 20-500 m²/g,
  (C) hydrophobic silicas having a BET surface area of 50-500 m²/g,
  optionally
  (D) organopolysiloxane resins composed of units of the formula $$R^2_e(R^3O)_fSiO_{(4-e-f)/2}$$ 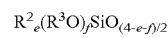

in which $R^2$ has the definition of R and $R^3$ has the definition of $R^1$,
  e is 0, 1, 2 or 3, and
  f is 0, 1, 2 or 3,
  with the proviso that the sum e+f is ≤3 and in less than 50% of all the units of the formula (II) in the organopolysiloxane resin, the sum e+f is 2,
  and optionally
  (E) water-insoluble organic compounds,
  is heated at temperatures of 50-250° C., until the viscosity has a value of less than 50%, preferably less than 40%, especially less than 30%, of the measured viscosity which the mixture had prior to heating, the viscosity being measured using a cone/plate viscometer at a temperature of 25° C. and a shear rate of 1/s, and
(2) subsequent to the in situ hydrophobization of the hydrophilic silicas carried out in (1) in the presence of the hydrophobic silicas,
  optionally
  (F) organopolysiloxanes which are different from (A) are mixed in.

Since the hydrophobic silica (C) used is already pretreated and requires no further hydrophobizing, and is also unable to contribute to the hydrophobizing of the hydrophilic silica, it could not have been expected that the presence of the pretreated hydrophobic silica would have any effect on the properties of the end product. All the more surprising was the fact that the compositions produced by the method of the invention, for which the hydrophilic silica (B) is hydrophobized in situ in the presence of the pretreated silica (C), exhibit a substantially better effectiveness as defoamers.

The radicals R and $R^2$ may be alkyl radicals, cycloalkyl radicals, alkenyl radicals, aryl radicals or aralkyl radicals. Examples of radicals R and $R^2$ are the methyl radical, the ethyl radical, the octyl radical, the 2-propenylphenyl radical, and the phenyl radical. Examples of substituted radicals R and $R^2$ are halogenated hydrocarbon radicals, such as the 3,3,3-trifluoropropyl radical or polar-substituted radicals such as the aminopropyl radical, the aminopropylaminoethyl radical, the methacryloylpropyl radical, and the glycidyloxypropyl radical. Particularly preferred as radical R and $R^2$ is the methyl radical.

Examples of radicals $R^1$ and $R^3$ are the hydrogen atom, the methyl radical, and the ethyl radical.

Particularly preferred as radical $R^1$ is the hydrogen atom.

The organopolysiloxanes (A) preferably contain on average 30-500 ppm by weight of Si-bonded OH groups; in other words, in 0.013 to 0.22 mol % of the units of the formula (I), b is 1 or a is 1 and $R^1$ is H, and in 99.78 to 99.987 mol % of the units of the formula (I), b is 0 or a is 2.

The organopolysiloxane (A) preferably has a viscosity (measured at 25° C. and 1013 hPa) of from 50-200 000 mm²/s, more preferably 500-20 000 mm²/s.

As organopolysiloxanes (A) it is preferred to use linear organopolysiloxanes of the general formula

$$R_{3-g}(R^1O)_gSi\text{—}[OSiR_2]_n\text{—}OSi(OR^1)_gR_{3-g} \qquad (III),$$

in which R and $R^1$ have the definition indicated for them above,
g is 0 or 1, and
n is an integer and has a value such that the viscosity of the organopolysiloxanes (A) is 10-10,000,000 mm²/s at 25° C. and 1013 hPa,
with the proviso that the organopolysiloxanes of the formula (III) have on average a Si-bonded OH group content of 30-500 ppm by weight.

As hydrophilic silica (B) it is preferred to use that having a BET surface area of 100-400 m²/g.

Examples of hydrophilic silicas (B) are hydrophilic fumed silicas and hydrophilic precipitated silicas.

Examples of hydrophilic fumed silicas available commercially are HDK® N 20, HDK® S13, and HDK® T30 (available commerially from Wacker Chemie AG, Munich), AEROSIL® 200 (available commercially from Evonik Degussa GmbH, Frankfurt am Main), and Cab-O-Sil® LM 150 (available commercially from Cabot GmbH, Rheinfelden).

Examples of hydrophilic precipitated silicas available commercially are Sipernat® 383 DS and Sipernat® 160 PQ (available commercially from Evonik Degussa GmbH, Frankfurt am Main) and also Syloid® 244 FP, (available commercially from Grace GmbH & Co. KG, Worms).

The compositions of the invention preferably comprise hydrophilic silicas (B) in amounts of 0.1 to 20 parts by weight, more preferably 1 to 10 parts by weight, based in each case on 100 parts by weight of component (A).

The pretreated hydrophobic silica (C) preferably has a BET surface area of from 50-200 m²/g. Use may be made of hydrophobic fumed silicas or else of other pretreated hydrophobic silicas such as hydrophobic precipitated silicas. Hydrophobic silicas pretreated in this way are known to the skilled person and commercialized, and are described in EP 726 086 A2, EP 967 252 A1, EP 1 304 361 B1, and EP 1 561 728 A2, for example.

Examples of hydrophobic fumed silicas available commercially are HDK® H2000 and HDK® H15 (available commercially from Wacker Chemie AG, Munich), and also AEROSIL® 972 and AEROSIL® 805 (available commercially from Evonik Degussa GmbH, Frankfurt am Main).

Examples of hydrophobic precipitated silicas available commercially are Sipernat® D10 and Sipernat® D17 (available commercially from Evonik Degussa GmbH, Frankfurt am Main).

The hydrophobic silica used as component (C) preferably has a carbon content of 0.1% to 5.0% by weight, more particularly from 0.5% to 3% by weight.

The hydrophobic silica used as component (C) preferably exhibits a methanol wettability of greater than 30% by weight, meaning that water is able to wet this hydrophobic silica only if it includes at least 30% by weight of methanol. More preferably the hydrophobic silica (C) displays a methanol wettability of greater than 50% by weight, more particularly 50% to 70% by weight.

The methanol titration test for determining the hydrophobicity of silica is described in DE-A 2107082, page 3, 2nd paragraph (corresponding U.S. Pat. No. 3,963,627, column 1, lines 52-63) and in EP 1 304 361 B1, page 11, line 15 ff.

The compositions of the invention comprise hydrophobic silicas (C) in amounts of preferably 0.1 to 20 parts by weight, more preferably 1 to 10 parts by weight, based in each case on 100 parts by weight of component (A).

The weight ratio of component (B) to component (C) is preferably 95:5 to 5:95, more preferably 80:20 to 20:80, and very preferably 70:30 to 30:70.

The optionally used component (D) comprises silicone resins composed of units of the formula (II), with the sum a+b being 2 in preferably less than 5% of the units in the resin.

With particular preference, component (D) comprises organopolysiloxane resins which consist substantially of $R^2{}_3SiO_{1/2}$ (M) units and $SiO_{4/2}$ (Q) units, where $R^2$ has the definition indicated for it above; these resins are also referred to as MQ resins. The molar ratio of M to Q units is preferably in the range from 0.5 to 2.0, more preferably in the range from 0.6 to 1.0. These silicone resins may further contain up to 10% by weight of free Si-bonded hydroxyl or alkoxy groups.

These organopolysiloxane resins (D) preferably have a viscosity of more than 1000 mPas at 25° C. or are solids. The weight-average molecular weight $M_w$ determined by gel permeation chromatography (and relative to a polystyrene standard) of these resins is preferably 200 to 200,000 g/mol, more preferably 1000 to 20,000 g/mol.

Components (D) are commercial products and/or can be prepared in accordance with methods that are commonplace within silicon chemistry, as for example in accordance with "Parsonage, J. R.; Kendrick, D. A. (Science of Materials and Polymers Group, University of Greenwich, London, UK SE18 6 PF) Spec. Publ.—R. Soc. Chem. 166, 98-106, 1995", U.S. Pat. No. 2,676,182 or EP-A 927 733.

The compositions of the invention preferably comprise organopolysiloxane resins (D) in amounts of 0.5 to 30 parts by weight, more preferably 0.1 to 10 parts by weight, based in each case on 100 parts by weight of component (A).

In addition to components (A) to (D), the compositions of the invention may comprise further substances, of the kind also used hitherto in defoamer formulations.

Examples of further substances are water-insoluble organic compounds (E). The term "water-insoluble" is intended to refer for the purposes of the present invention to a solubility in water at 25° C. and under a pressure of 1013 hPa of not more than 3 percent by weight.

The water-insoluble organic compounds are preferably compounds having a boiling point of greater than 100° C. under the pressure of the surrounding atmosphere, in other words at 900 to 1100 hPa, more particularly those selected from mineral oils, natural oils, isoparaffins, polyisobutylenes, residues from the oxo synthesis of alcohols, esters of low molecular weight synthetic carboxylic acids, fatty acid esters, such as octyl stearate and dodecyl palmitate, for example, fatty alcohols, ethers of low molecular weight alcohols, phthalates, esters of phosphoric acid, and waxes.

The compositions of the invention preferably comprise water-insoluble organic compound (E) in amounts of 0 to 1000 parts by weight, more preferably 0 to 100 parts by weight, based in each case on 100 parts by weight of the total weight of components (A) to (E).

The compositions of the invention can be prepared in method step (1) by known methods, by the mixing of all of components (A) to (D), optionally (E), for example, using high shearing forces in colloid mills, dissolvers or rotor-stator homogenizers. This mixing operation may take place under reduced pressure, in order to prevent the mix incorporation of air present, for example, in highly disperse fillers, such as the silicas (B) and (C). The mixing of all of the components is preferably followed by the heating of the mixture and hence the in situ hydrophobizing of the hydrophilic silica (B) in the presence of the hydrophobic silica (C).

The mixing and heating may alternatively take place, in whole or in part, simultaneously—accordingly, for example, heating takes place as early as during the mixing of the components.

The compositions of the invention are produced in compounders, dissolvers, and colloid mills, for example.

Heating in method step (1) is preferably carried out at temperatures of 100 to 200° C. and under the pressure of the surrounding atmosphere, i.e., between 900 and 1100 hPa.

In the preparation of the composition of the invention in method step (1), a mixing energy is introduced with preferably more than 3.0 kJ/kg, more preferably more than 8 kJ/kg, more particularly 10 to 150 kJ/kg.

The in situ hydrophobizing of the hydrophilic silica (B) in method step (1) preferably takes place by heating of the mixture for a number of hours in method step (1). Heating takes place preferably for 1 to 10 hours, more preferably 2 to 5 hours.

This in situ hydrophobizing may take place with addition of catalysts (G) that promote in situ hydrophobizing, preferably alkali metal hydroxides. Preferred examples of alkali metal hydroxides are sodium hydroxide and potassium hydroxide, with potassium hydroxide being particularly preferred.

With particular preference the in situ hydrophobizing takes place in method step (1) in the presence of 100-5000 ppm by weight, more particularly 500-2000 ppm by weight, of catalysts (G) which promote the in situ hydrophobizing, preferably alkali metal hydroxides, more preferably KOH, which are metered preferably as a solution, in polydimethylsiloxane or methanol, for example, with the ppm by weight of catalyst (G) being based in each case on the total amount of the mixture (1).

Prior to heating, the mixture (1) preferably has a viscosity of preferably 10,000 mPa·s to 1,000,000 mPa·s, the viscosity being measured using a cone/plate viscometer at a temperature of 25° C. and a shear rate of 1/s.

In the course of the heating in method step (1), the viscosity of the mixture falls, preferably sharply.

After the mixture has been heated, the viscosity has a value of preferably at least 5%, more preferably at least 10%, of the measured viscosity of the mixture prior to heating, the viscosity being measured with a cone/plate viscometer at a temperature of 25° C. and a shear rate of 1/s.

After the heating in method step (1), the mixture has a viscosity of preferably 1000 mPa·s to 200 000 mPa·s, the viscosity being measured with a cone/plate viscometer at a temperature of 25° C. and a shear rate of 1/s.

Following the in situ hydrophobizing in method step (1), the mixture may be admixed with further components, such as organopolysiloxanes (F), which are different from organopolysiloxanes (A).

As component (F) it is possible to use all polysiloxanes which do not fall within the definitions of components (A) or (D). Employed more particularly as components (F) are linear polyethersiloxanes (F) in which the polyether radicals are SiC-bonded pendantly to linear siloxane chains via hydrocarbon radicals, preferably divalent hydrocarbon radicals. Linear polyether-polysiloxane copolymers of these kinds are described in GB 2 350 117 A, for example.

The polyethersiloxanes (F) are preferably polyethersiloxanes which have a siloxane backbone with 10-200, more particularly 20-100, siloxane units and in which 2-20%, more particularly 5-15%, of the siloxane units carry an SiC-bonded polyether radical Z of the formula

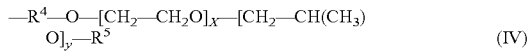

$$-R^4-O-[CH_2-CH_2O]_x-[CH_2-CH(CH_3)O]_y-R^5 \quad (IV)$$

where
x has a value of 0-100, preferably 5-50,
y has a value of 5-100, preferably 5-50,
and the ratio x:y is 4:1 to 0:1,
$R^4$ denotes a divalent hydrocarbon radical having 1-10 carbon atoms, preferably a $C_{1-10}$ alkylene radical,
$R^5$ is identical or different and denotes a hydrogen atom or an optionally substituted hydrocarbon radical having 1-30 carbon atoms, or a carboxyl radical of the formula $-C(O)R^6$, where the radical $R^6$ is a $C_{1-3}$ alkyl radical, such as methyl or ethyl radical.

Preferably $R^4$ is a radical of the formula $-CH_2-CH_2-CH_2-$.

The radical $R^5$ is preferably a hydrogen atom or a monovalent hydrocarbon radical having 1-18 C atoms.

Examples of radicals $R^5$ are a hydrogen atom or a $C_{1-6}$ alkyl radical.

Preferred polyethersiloxanes (F) used are those of the general formula

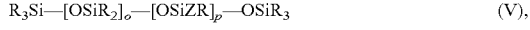

$$R_3Si-[OSiR_2]_o-[OSiZR]_p-OSiR_3 \quad (V),$$

where the polyether radical Z and the radical R have the definition indicated for them above,
o is an integer from 5 to 500, preferably 10 to 100, and
p is an integer from 1 to 50, preferably 2 to 15.

In formula (V) the sum o+p is preferably 20 to 200, more preferably 20 to 100, and preferably an average of 2-20%, more particularly 5-15%, of the siloxane units o+p have an SiC-bonded polyether radical Z.

The cloud point of the polyethersiloxanes (F) is measured according to DIN EN 1890 method A.

The cloud point of the polyethersiloxanes (F) is preferably less than 40° C., more preferably less than 30° C., very preferably less than 25° C., i.e., the polyethersiloxanes have a water-solubility of less than 1% at 25° C.

As component (F) it is also possible to use branched polyethersiloxanes. Examples of branched polyethersiloxanes are those in which the polyether radicals are pendantly SiC-bonded to linear siloxane chains via hydrocarbon radicals, preferably divalent hydrocarbon radicals, and these linear siloxane chains are joined to one another via pendant organic bridges.

Examples of these organic bridges are SiC-bonded linear or branched organic radicals, preferably divalent hydrocarbon radicals, which may contain one or more heteroatoms selected from the group of oxygen atoms and nitrogen atoms, such as alkylene radicals, SiC-bonded polyether radicals which are bonded to the siloxane chains via alkylene radicals, and SiC-bonded divalent hydrocarbon radicals, such as alkylene radicals, which contain polyether groups and urethane groups.

Especially suitable as branched polyethersiloxanes (F) are branched polyether-polysiloxane copolymers, of the kind described as a component of defoamers in EP 1 076 073 A1, EP 1 424 117 A2 or WO 2006/128624 A1, for example.

Preferred branched polyether-polysiloxane copolymers are those in which the siloxane chains are joined to one another via pendant divalent SiC-bonded hydrocarbon radicals which contain polyether radicals and urethane groups.

These polyether-polysiloxane copolymers and their preparation are described in WO 2006/128624 A1, more particularly at page 3, line 8 to page 13, line 38 (incorporated by reference).

If the compositions of the invention include polyethersiloxanes as component (F), then they preferably comprise polyethersiloxanes (F) in amounts of 1 to 200 parts by weight, more preferably 2 to 100 parts by weight, based in each case on 100 parts by weight of component (A).

In a further embodiment, the composition of the invention comprises as component (F) organopolysiloxanes different from (A) and composed of units of the general formula

$$R_k(R^6O)_l SiO_{(4-k-l)/2} \quad (VI),$$

in which
R has the definition indicated for it above,
$R^6$ may be identical or different and denotes a monovalent, linear and/or branched hydrocarbon radical having at least 6 carbon atoms, preferably 6-30 carbon atoms,
k is 0, 1, 2 or 3, and
l is 0, 1, 2 or 3, on average 0.005 to 0.5,
with the proviso that the sum k+l is ≤3, on average 1.9 to 2.1.

Organopolysiloxanes (F) of this kind, of the formula (VI), are obtainable for example by alkali-catalyzed condensation of silanol-terminated polydimethylsiloxanes with a viscosity of 50 to 50,000 mPa·s at 25° C. and aliphatic alcohols having at least 6 carbon atoms, such as isotridecyl alcohol, n-octanol, stearyl alcohol, 4-ethylhexadecanol or eicosanol.

If the compositions of the invention include organopolysiloxanes of the formula (VI) as component (F), then they preferably comprise them in amounts of 0.5 to 30 parts by weight, more preferably 1 to 10 parts by weight, based in each case on 100 parts by weight of component (A).

Besides the components (A) to (G), the compositions of the invention may comprise further constituents, examples being impurities inherent in the preparation process, such as cyclic siloxanes. There are preferably none or less than 5% of these constituents present.

The compositions of the invention are preferably viscous, clear to opaque, colorless liquids.

The compositions of the invention after method step (1) and (2) preferably have a viscosity of 1000 to 200,000 mPas, more preferably of 5000 to 50,000 mPas, in each case at 25° C. and 1013 hPa.

The method of the invention may be carried out batchwise, semibatchwise, or wholly continuously.

The compositions of the invention may be solutions, dispersions or powders.

The invention accordingly provides a method for producing emulsions of defoamer compositions comprising hydrophobic silicas, which comprises mixing the defoamer compositions, produced by the method of the invention, with emulsifiers,
optionally thickeners,
and water.

For preparing the emulsions of the defoamer compositions produced by the method of the invention it is possible to use any emulsifiers known to the skilled person for the preparation of silicone emulsions, such as anionic, cationic or nonionic emulsifiers, for example. It is preferred to use emulsifier mixtures, in which case there should be at least one nonionic emulsifier present, preferably selected from the group of sorbitan fatty acid esters, ethoxylated sorbitan fatty acid esters, ethoxylated fatty acids, ethoxylated linear or branched alcohols having 10 to 20 carbon atoms, and/or glycerol esters. As thickeners it is possible, furthermore, for known compounds, such as polyacrylic acid, polyacrylates, cellulose ethers, such as carboxymethylcellulose and hydroxyethylcellulose, natural thickeners, such as xanthan gum, for example, and polyurethanes, and also preservatives and other customary additives known to the person skilled in the preparation of silicone emulsions, to be added.

The continuous phase of the emulsions of the invention is preferably water. However, compositions of the invention can also be prepared in the form of emulsions where the continuous phase is formed by components (A) to (G). These may also be multiple emulsions.

Processes for preparing silicone emulsions are known. Preparation takes place typically by simple stirring together of all the constituents and optional subsequent homogenization with jet dispersers, rotor-stator homogenizers, colloid mills or high-pressure homogenizers.

Where the composition of the invention comprises emulsions, preference is given to oil in water emulsions comprising 5% to 50% by weight of components (A) to (G), 1% to 20% by weight of emulsifiers and thickeners, and 30% to 94% by weight of water.

The compositions of the invention can also be formulated as free-flowing powders. These powders are preferred in the context, for example, of application in powder laundry detergents. The preparation of these powders, starting from the mixture of components (A) to (E), optionally (F), and optionally (G), takes place in accordance with methods that are known to the skilled person, such as spray drying or agglomerative granulation, and using adjuvants known to the skilled person.

The invention accordingly provides a method for producing powders, which comprises mixing the defoamer compositions produced by the method of the invention with carrier materials.

The powders of the invention comprise preferably 2% to 20% by weight of the composition of the invention comprising components (A) to (G). Carriers employed may be, for example zeolites, sodium sulfate, cellulose derivatives, urea, and sugars. The powders of the invention comprise 50% to 95% by weight of carrier materials. Further constituents of the powders of the invention may be, for example, waxes, or organic polymers, of the kind described in EP-A 887 097 and EP-A 1 060 778, for example.

The defoamer compositions of the invention can be used wherever disruptive foam is to be suppressed. This is the case, for example, in nonaqueous systems such as in tar distillation or in petroleum processing. The defoamer compositions of the invention are particularly suitable for controlling foam in aqueous surfactant systems, for use in detergents, for controlling foam in wastewater plants, in textile dyeing processes, in the scrubbing of natural gas, in polymer dispersions, and for defoaming aqueous media that arise in the production of pulp.

The present invention accordingly further provides a method for defoaming and/or for preventing the foaming of media, by mixing the compositions of the invention or their emulsions or powders with the media.

The compositions of the invention are used preferably for defoaming and/or for preventing foaming in aqueous media which arise during the production of pulp.

The defoamer compositions of the invention may also be used in detergents and care products, such as fabric softeners, for example, in which case the defoamer compositions of the invention may be used as they are or in the form of emulsions or powders.

The addition of the composition of the invention to the foaming media may take place directly, in solution in suitable solvents, such as toluene, xylene, methyl ethyl ketone or tert-butanol, as a powder, or as an emulsion. The amount required to achieve the desired defoamer effect is guided, for example, by the nature of the medium, by the temperature, and by the turbulence that occurs.

Based on the total weight of the medium to be defoamed, the compositions of the invention are added preferably in amounts of 0.1 ppm by weight to 1% by weight, more particularly in amounts of 1 to 100 ppm by weight, to the foaming medium.

The method of the invention is carried out preferably under the pressure of the surrounding atmosphere, in other words at about 900 to 1100 hPa. The method of the invention can also be carried out at higher or lower pressures, such as, approximately, at 3000 to 4000 hPa or 1 to 10 hPa.

Surprisingly it has been found that the effectiveness and manageability of the defoamer formulations of the invention are improved substantially by the method of the invention. The defoamer formulation of the invention are notable in particular for very good manageability and meterability and for high effectiveness in terms of both of instantaneous foam collapse and of long-term effect.

The compositions of the invention have the advantage that they are distinguished by a high and long-lasting effectiveness in a very wide variety of different media when added in small quantities. This is extremely advantageous from the standpoints both of economics and of the environment.

The method of the invention has the advantage that it is easy to implement and highly economical.

In the examples below, all parts and percentages, unless indicated otherwise, are by weight. Unless indicated otherwise, the following examples are carried out under the pressure of the surrounding atmosphere, in other words at about 1000 hPa, and at room temperature, in other words about 20° C., or at a temperature which comes about when the reactants are combined at room temperature without additional heating or cooling. All of the viscosity figures quoted in the examples are intended to relate to a temperature of 25° C.

Tests of Defoamer Effectiveness in Black Liquor 400 ml of black liquor from the pulp process (hardwood from UPM Kymmene Oy from Kuusankoski, Finland) are pumped in circulation at a pumping rate of 1.5 l/min in a 1000 ml circulation pumping apparatus thermostatted at 80° C.

As soon as the foam level has reached a height of 75 mm, the defoamer (10 mg based on the defoamer formulations of example 1 and on comparative experiments C1 to C3) is metered in, and a record is made of the foam collapse time and of the lowest foam level reached following addition of defoamer and start of foam collapse. The smaller the foam collapse time t1 and the lower the foam level h1, the better the rapid effect of a defoamer. After that, the long-term effect of the defoamer is ascertained, representing the timespan t2 required to get from the lowest foam level to the original foam level (75 mm).

Substances Used:

Siloxane A: a polydimethylsiloxane terminated with trimethylsiloxy groups and having a viscosity of 8000 mm$^2$/s and a silanol group fraction of 350 ppm by weight.

Filler B: a hydrophilic fumed silica having a surface area of 300 m$^2$/g, obtainable under the name HDK® T30 from Wacker Chemie AG Munich Filler C: a hydrophobized fumed silica having a surface area of 150 m$^2$/g, obtainable under the name HDK® H2000 from Wacker Chemie AG Munich. This silica had a carbon content of 2.8% by weight and a methanol wettability of 65% by weight.

Organopolysiloxane resin D: a silicone resin which is solid at room temperature and is composed of trimethylsiloxy units and SiO$_2$ units in a molar ratio of 0.61/1, having a weight-average molar mass of 5728 g/mol (relative to polystyrene standard) and an Si-bonded hydroxyl group content of 0.8% by weight.

Water-Insoluble Organic Compound E:

A hydrocarbon mixture with a boiling range of 230 to 270° C. at 1013 hPa.

Polyethersiloxane F: This polymer is prepared as follows: 67 g of a siloxane terminated with methyl groups and composed of dimethylsiloxy and hydrogenmethylsiloxy units, having an active hydrogen content of 0.133% and a viscosity of 72 mm$^2$/s (25° C.), are mixed with vigorous stirring with 408 g of an allyl polyether (560 ppm H$_2$O content) having a PO/EO ratio of 4.0 and an iodine number of 11.2, and the mixture is heated to 100° C. Hydrosilylation is initiated by adding 0.5 ml of a 2% strength solution of hexachloroplatinic acid in isopropanol, and is manifested in a slightly exothermic reaction. The reaction mixture is held at 100 to 110° C. until a clear copolymer is obtained and active hydrogen is no longer detectable. The polysiloxane with pendant polyether groups has a viscosity of 870 mm$^2$/s (25° C.) and a cloud point of less than 25° C.

Catalyst G: a 20% strength solution of KOH in methanol.

Example 1

Inventive 83 parts of organopolysiloxane A, 6 parts of filler B, 2 parts of filler C, 2.5 parts of organopolysiloxane resin D, and 2.5 parts of mineral oil E are mixed and homogenized and heated at 150° C. for 4 hours in the presence of 7500 ppm of catalyst G. The viscosity of the mixture is determined before and after heating, in other words before and after the in situ hydrophobizing, with the viscosity being measured using a cone/plate viscometer at a temperature of 25° C. and a shear rate of 1/s. The results are summarized in table 1.

After it has been heated, the mixture is admixed further with 4 parts of polyethersiloxane F, which are incorporated homogeneously.

Comparative Example 1

Only In Situ Hydrophobized Silica 83 parts of organopolysiloxane A, 8 parts of filler B, 2.5 parts of organopolysiloxane resin D, and 2.5 parts of mineral oil E are mixed and homogenized and heated at 150° C. for 4 hours in the presence of 7500 ppm of catalyst G. The viscosity of the mixture is determined before and after heating, with the viscosity being measured using a cone/plate viscometer at a temperature of 25° C. and a shear rate of 1/s. The results are summarized in table 1.

After it has been heated, the mixture is admixed further with 4 parts of polyethersiloxane F, which are incorporated homogeneously.

Comparative Example 2

Only Pretreated Hydrophobized Silica 83 parts of organopolysiloxane A, 8 parts of filler C, 2.5 parts of organopolysiloxane resin D, and 2.5 parts of mineral oil E are mixed and homogenized and heated at 150° C. for 4 hours in the presence of 7500 ppm of catalyst G. The viscosity of the mixture is determined before and after heating, with the viscosity being measured using a cone/plate viscometer at a temperature of 25° C. and a shear rate of 1/s. The results are summarized in table 1.

After it has been heated, the mixture is admixed further with 4 parts of polyethersiloxane F, which are incorporated homogeneously.

Comparative Example 3

In Situ Hydrophobized Silica and Pretreated Silica; the In Situ Hydrophobizing Takes Place Before the Addition of the Pretreated Silica 83 parts of organopolysiloxane A, 6 parts of filler B, 2.5 parts of organopolysiloxane resin D, and 2.5 parts of mineral oil E are mixed and homogenized and heated at 150° C. for 4 hours in the presence of 7500 ppm of catalyst G. The viscosity of the mixture is determined before and after heating, with the viscosity being measured using a cone/plate viscometer at a temperature of 25° C. and a shear rate of 1/s. The results are summarized in table 1.

After it has been heated, the mixture is admixed further with 2 parts of filler C and 4 parts of polyethersiloxane F, which are incorporated homogeneously.

TABLE 1

Appearance and viscosities of example 1 and comparative experiments C1-C3

| Example/ comparative experiment (without polyethersiloxane F) | Viscosity in mPas at 25° C. and D = 1/s Physica cone/plate) | | Appearance |
|---|---|---|---|
| | After full heating | Before full heating | |
| 1 (inventive) | 50,500 | 490,000 | Manageable composition, no filler sedimentation |
| C1 (not inventive) | 77,200 | 330,000 | High-viscosity composition, poor manageability |
| C2 (not inventive) | 23,000 | 9600 | Low-viscosity composition, tends toward filler sedimentation |
| C3 (not inventive) | 64,700 | 235,000 | High-viscosity composition, poor manageability |

The defoamer compositions according to example 1 and to the comparative experiments, and after the incorporation of the polyethersiloxane F, are diluted in each case with mineral oil E to give a 40% strength by weight solution, and are metered into the black liquor by means of a pipette, for the testing of the respective effectiveness of the defoamer compositions. The results of the effectiveness testing are summarized in table 2.

TABLE 2

Results of the testing of defoamer effectiveness in hardwood black liquor

| Example/ comparative experiment | Foam collapse time t1 in [s] | Foam level h1 after foam collapse [mm] | Long-term effect t2 in [s] |
|---|---|---|---|
| 1 (inventive, filler B and filler C are fully heated jointly) | 10 | 10 | 597 |
| C1 (not inventive, no filler C) | 21 | 18 | 480 |
| C2 (not inventive, no filler B) | 12 | 13 | 403 |
| C3 (not inventive, filler C is added after the full heating of filler B) | 14 | 13 | 365 |

From the results summarized in table 2 it is clearly apparent that

Comparative experiment C1 does possess a similar long-term effect, but has a significantly poorer foam collapse than inventive example 1. Moreover, on account of the viscosity, which is almost twice as high, it is substantially more difficult to handle.

Comparative experiment C2 has a good rapid effect, but the effect does not last long. The tendency toward filler sedimentation is also a distinct disadvantage in comparison to the defoamer produced in accordance with the invention. On the other hand, the exclusive use of silica which has already been hydrophobized, i.e., pretreated, such as filler C, is also a disadvantage on cost grounds, owing to the higher price as compared with hydrophilic silica.

Comparative experiment C3 possesses a good rapid effect, but is much poorer in its long-term effect than example 1.

Since the pretreated hydrophobic silica (filler C) with the methanol wettability of 65% by weight and the carbon content of 2.8% by weight may be considered to have already been fully hydrophobized, but on the other hand makes no contribution to hydrophobizing the hydrophilic silica, the assumption was that the timing of the addition of this filler cannot have any influence over the product properties. It was surprising, therefore, that when the method of the invention was carried out in accordance with example 1, defoamer formulations are obtained which in terms of manageability (moderate viscosity and no filler sedimentation), rapid effect (immediate foam collapse and foam height), and long-term effect, are superior to the formulations produced according to the prior art.

Example 2

100 parts of a defoamer formulation from example 1 are mixed at 60° C. with 30 parts of sorbitan monostearate (available under the name "Span 60" from Croda GmbH D-Nettetal) and with 20 parts of polyoxyethylene(20)sorbitan monostearates (available under the name "Tween 60" from Uniqema D-Emmerich) and diluted in steps with 500 parts of water. Added to this mixture are 2 parts of a polyacrylic acid (available under the name "Carbopol 934" from BF Goodrich D-Neuss), followed by mixing and addition of a further 345 parts of water and 3 parts of an isothiazolinone-based preservative (available under the name "Acticide MV" from Thor-Chemie, D-Speyer). The emulsion is subsequently homogenized at 100 bar using a high-pressure homogenizer, and adjusted with 10% strength NaOH to a pH of 6-7.

The resulting defoamer emulsion was outstandingly suitable for defoaming aqueous surfactant solutions.

Example 3

35 ml of a 2% strength solution of a high molecular weight copolymer of acrylic acid, methacryloyl stearate, and pentaerythritol diallyl ether (in a molar ratio of 100:2:0.3) (and having, when neutralized, a viscosity of 17,500 mm²/s) were placed in a glass beaker, and 10 g of the defoamer formulation according to example 2 were added slowly, with intensive mixing using a paddle stirrer, to give, after 10 minutes' stirring, an emulsion of the defoamer formulation in the polymer solution. Added to this emulsion with continued stirring were 88.5 g of light sodium carbonate, after which the water was removed under reduced pressure, with continued mixing. Thereafter, 0.5 g of a hydrophilic silica having a BET surface area of 200 m²/g (available from Wacker-Chemie GmbH under the name HDK® N20) was mixed in.

A white, free-flowing powder was obtained. This powder was successfully used for foam prevention in powder laundry detergents or in powder crop-protection concentrates.

Example 4

The procedure according to example 1 is repeated, with the modification that instead of the fumed hydrophobized silica (filler C), a precipitated hydrophobic silica is employed as component (C), having a BET surface area of 90 m²/g, a carbon content of 3%, and a methanol wettability of 60% (available under the name Sipernat D10 from Evonik-Degussa GmbH, Frankfurt am Main). In contrast to the procedure in example 1, the fillers (B) and (C) are mixed at 150° C. into the mixture of (A) and (D), and the resulting mixture is then heated as in example 1 for a further 4 hours in the presence of 7500 ppm of catalyst (G).

A defoamer with particularly good effectiveness was likewise obtained.

The invention claimed is:

1. A method for producing defoamer compositions comprising hydrophobic silica, comprising:
   (1) providing a mixture comprising
   (A) organopolysiloxanes(s) having a viscosity of 500 to 20,000 mm²/s at 25° C. and 1013 hPa, and comprising units of the formula (I)

$$R_a(R^1O)_bSiO_{(4-a-b)/2} \quad (I),$$

in which
   R are each identical or different and denote a monovalent, optionally substituted hydrocarbon radical having 1-30 carbon atoms or a hydrogen atom,
   $R^1$ are each identical or different and denote hydrogen or a monovalent hydrocarbon radical having 1-4 carbon atoms,
   a is 0, 1, 2 or 3, and
   b is 0, 1, 2 or 3,
   with the proviso that the sum a+b is ≤3 and in more than 50% of all the units of the formula (I) in the organopolysiloxane (A), the sum a+b is 2, and the hydroxyl content is from 30 ppm to 500 ppm by weight, the viscosity of the organopolysiloxanes (A) being determined by the number of units of the formula (I),
   (B) hydrophilic silica(s) having a BET surface area of 100-400 m²/g, the hydrophilic silicas being present in amounts of 1 to 10 parts by weight, based on 100 parts by weight of organopolysiloxanes (A),
   (C) hydrophobic silica(s) having a BET surface area of 50-200 m²/g, the hydrophobic silicas being present in amounts of 1 to 10 parts by weight, based on 100 parts by weight of organopolysiloxanes (A),
   (D) optionally, organopolysiloxane resin(s) comprising units of the formula

   $$R^2_e(R^3O)_fSiO_{(4-e-f)/2} \quad (II),$$

in which $R^2$ has the definition of R, and $R^3$ has the definition of $R^1$,
   e is 0, 1, 2 or 3, and
   f is 0, 1, 2 or 3,
   with the proviso that the sum e+f is ≤3 and in less than 50% of all the units of the formula (II) in the organopolysiloxane resin, the sum e+f is 2,
   and optionally
   (E) water-insoluble organic compound(s),
   (2) heating the mixture provided in (1) at a temperature of 50-250° C., until the viscosity of the mixture has a value of less than 50%, of the measured viscosity which the mixture had prior to heating, the viscosity measured using a cone/plate viscometer at a temperature of 25° C. and a shear rate of 1/s, and
   (3) subsequent to the in situ hydrophobization of the hydrophilic silicas carried out in (2) in the presence of the hydrophobic silicas, optionally admixing
   (F) organopolysiloxanes which are different from (A).

2. The method of claim 1 wherein R has 1-18 carbon atoms.

3. The method of claim 1 wherein in step (2), the viscosity of the mixture after heating is less than 40% of the viscosity prior to heating.

4. The method of claim 1, wherein the mixture in (1) is heated in the presence of catalyst(s) (G) which promote in situ hydrophobization.

5. The method of claim 4, wherein the catalyst comprises an alkali metal hydroxide.

6. The method of claim 1, wherein organopolysiloxanes (A) comprise linear organopolysiloxanes of the formula

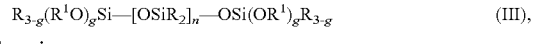
$$R_{3-g}(R^1O)_gSi-[OSiR_2]_n-OSi(OR^1)_gR_{3-g} \quad (III),$$

wherein
g is 0 or 1, and
n is an integer and has a value such that the viscosity of the organopolysiloxanes (A) is 500-20,000 mm²/s at 25° C. and 1013 hPa,
with the proviso that the organopolysiloxanes of the formula (III) have on average an Si-bonded OH group content of 30-500 ppm by weight.

7. The method of claim 1, wherein hydrophobic silica (C) has a carbon content of 0.1 to 5.0% by weight and a methanol wettability of greater than 30% by weight.

8. The method of claim 1 wherein in step (2), the viscosity of the mixture after heating is less than 30% of the viscosity prior to heating.

9. The method of claim 1, wherein the weight ratio of the hydrophilic silica(s) (B) to the hydrophobic silicas (C) is 95:5 to 5:95.

10. The method of claim 1, wherein the weight ratio of the hydrophilic silica(s) (B) to the hydrophobic silicas (C) is 80:20 to 20:80.

11. The method of claim 1, wherein the weight ratio of the hydrophilic silica(s) (B) to the hydrophobic silicas (C) is 70:30 to 30:70.

12. The method of claim 1, wherein organopolysiloxanes(s) (D) comprise substantially $R^2{}_3SiO_{1/2}$ (M) units and $SiO_{4/2}$ (Q) units, and where the molar ratio of M to Q units is in the range from 0.5 to 2.0.

13. The method of claim 1, wherein the weight ratio of the hydrophilic silica(s) (B) to the hydrophobic silicas (C) is 0.6 to 1.0.

14. The method of claim 1, wherein water-insoluble organic compound(s) (E) are present and include at least one compound selected from the group consisting of mineral oils, natural oils, isoparaffins, polyisobutylenes, residues from the oxo synthesis of alcohols, esters of low molecular weight synthetic carboxylic acids, fatty acid esters, fatty alcohols, ethers of low molecular weight alcohols, phthalates, esters of phosphoric acid, and waxes.

15. The method of claim 1, wherein (F) organopolysiloxanes, which are different from (A) are present, and comprise linear or branched polyethersiloxanes.

16. A method for producing emulsions of defoamer compositions comprising hydrophobic silicas, comprising:
mixing a defoamer composition produced by the method of claim 1 with emulsifier(s), optionally thickener(s), and water.

17. A method for producing defoamer powders, comprising mixing a defoamer composition produced by the method of claim 1 with at least one carrier material.

18. A method for defoaming and/or preventing the foaming of liquid media, comprising mixing a defoamer composition of claim 1, an emulsion thereof, or a powder thereof, with the liquid media.

19. The method of claim 18, wherein the liquid media is an aqueous media produced during the production of pulp.

20. The method of claim 1, wherein in organopolysiloxane(s) (A), R and $R^1$ are methyl.

21. A method for producing defoamer compositions comprising hydrophobic silica, comprising:

(1) providing a mixture comprising
(A) organopolysiloxanes(s) having a viscosity of 500 to 20,000 mm²/s at 25° C. and 1013 hPa, and comprising units of the formula (I)

$$R_a(R^1O)_bSiO_{(4-a-b)/2} \qquad (I),$$

in which
R is hydrogen or methyl,
$R^1$ are each identical or different and denote hydrogen or methyl,
a is 0, 1, 2 or 3, and
b is 0, 1, 2 or 3,
with the proviso that the sum a+b is ≤3, in more than 50% of all the units of the formula (I) in the organopolysiloxane (A), the sum a+b is 2,
the viscosity of the organopolysiloxanes (A) being determined by the number of units of the formula (I),
(B) hydrophilic silica(s) having a BET surface area of 100-400 m²/g, the hydrophilic silicas being present in amounts of 1 to 10 parts by weight, based on 100 parts by weight of organopolysiloxanes (A),
(C) hydrophobic silica(s) having a BET surface area of 50-200 m²/g, the hydrophobic silicas being present in amounts of 1 to 10 parts by weight, based on 100 parts by weight of organopolysiloxanes (A),
(D) optionally, organopolysiloxane resin(s) comprising units of the formula $$R^2{}_e(R^3O)_fSiO_{(4-e-f)/2} \qquad (II),$$

in which $R^2$ has the definition of R, and $R^3$ has the definition of $R^1$,
e is 0, 1, 2 or 3, and
f is 0, 1, 2 or 3,
with the proviso that the sum e+f is ≤3 and in less than 50% of all the units of the formula (II) in the organopolysiloxane resin, the sum e+f is 2,
and optionally
(E) water-insoluble organic compound(s),
(2) heating the mixture provided in (1) at a temperature of 50-250° C., until the viscosity of the mixture has a value of less than 50%, of the measured viscosity which the mixture had prior to heating, the viscosity measured using a cone/plate viscometer at a temperature of 25° C. and a shear rate of 1/s, and
(3) subsequent to the in situ hydrophobization of the hydrophilic silicas carried out in (2) in the presence of the hydrophobic silicas, optionally admixing
(F) organopolysiloxanes which are different from (A).

* * * * *